United States Patent
Xie et al.

(10) Patent No.: US 10,674,414 B2
(45) Date of Patent: Jun. 2, 2020

(54) SUPER-CELL HANDOVER METHOD AND APPARATUS

(71) Applicant: Huawei Technologies Co., Ltd., Shenzhen (CN)

(72) Inventors: Yong Xie, Shenzhen (CN); Yalin Liu, Shenzhen (CN); Sainan Li, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/132,964

(22) Filed: Sep. 17, 2018

(65) Prior Publication Data

US 2019/0014517 A1    Jan. 10, 2019

Related U.S. Application Data

(60) Provisional application No. PCT/CN2016/113341, filed on Dec. 30, 2016.

(30) Foreign Application Priority Data

Mar. 18, 2016 (CN) .......................... 2016 1 0156672

(51) Int. Cl.
*H04W 36/04* (2009.01)
*H04W 36/30* (2009.01)
(Continued)

(52) U.S. Cl.
CPC .......... *H04W 36/04* (2013.01); *H04B 17/318* (2015.01); *H04L 5/0048* (2013.01);
(Continued)

(58) Field of Classification Search
CPC ......... H04W 36/0058; H04W 36/0061; H04W 36/0085; H04W 36/04; H04W 36/30; H04W 88/085
See application file for complete search history.

(56) References Cited

U.S. PATENT DOCUMENTS

2002/0197984 A1 * 12/2002 Monin ................... H04W 8/26
                                                    455/419
2011/0312316 A1    12/2011 Baldemair et al.
(Continued)

FOREIGN PATENT DOCUMENTS

CN        102413548 A    4/2012
CN        103039028 A    4/2013
(Continued)

OTHER PUBLICATIONS

Huawei et al., "UL based mobility in RRC_ACTIVE," 3GPP TSG-RAN WG2 Meeting #96, R2-168561, Reno, United States of America, Nov. 14-18, 2016, 5 pages.
(Continued)

*Primary Examiner* — Ayaz R Sheikh
*Assistant Examiner* — Debebe A Asefa
(74) *Attorney, Agent, or Firm* — Slater Matsil, LLP

(57) ABSTRACT

This application discloses a super-cell handover method which is applied to an NCS and includes: receiving, by a first LE, measurement reports sent by a plurality of first TPs, where the measurement reports are determined by the plurality of first TPs based on a reference signal sent by target UE in a second super cell, the first LE is in a first super cell, the plurality of first TPs are in the first super cell, and the second super cell is adjacent to the first super cell; determining a first handover policy based on a preset condition and the measurement reports, where the first handover policy indicates whether the first LE allows to hand over the UE from the second super cell to the first super cell; and sending indication information of the first handover policy to a second LE, where the second LE is in the second super cell.

20 Claims, 8 Drawing Sheets

(51) Int. Cl.
*H04B 17/318* (2015.01)
*H04W 36/00* (2009.01)
*H04L 5/00* (2006.01)
*H04W 88/08* (2009.01)

(52) U.S. Cl.
CPC ... *H04W 36/0058* (2018.08); *H04W 36/0061* (2013.01); *H04W 36/0085* (2018.08); *H04W 36/30* (2013.01); *H04W 88/085* (2013.01)

(56) References Cited

U.S. PATENT DOCUMENTS

| | | | |
|---|---|---|---|
| 2012/0071200 A1 | 3/2012 | Bienas et al. | |
| 2012/0218937 A1* | 8/2012 | Chen | H04B 7/065 370/328 |
| 2015/0141002 A1 | 5/2015 | Ma et al. | |
| 2015/0181492 A1 | 6/2015 | Schmidt et al. | |

FOREIGN PATENT DOCUMENTS

| | | |
|---|---|---|
| CN | 103428727 A | 12/2013 |
| CN | 103428757 A | 12/2013 |
| CN | 103650565 A | 3/2014 |
| CN | 105050141 A | 11/2015 |
| EP | 2838218 A1 | 2/2015 |
| EP | 2884800 A1 | 6/2015 |
| WO | 2010058375 A1 | 5/2010 |

OTHER PUBLICATIONS

Intel Corporation, "Analysis of UL vs DL Measurement for connected state," 3GPP TSG RAN WG2 Meeting #95bis, R2-166889, Kaohsiung, Oct. 10-14, 2016, 5 pages.

* cited by examiner

SUPER-CELL HANDOVER METHOD AND APPARATUS

CROSS-REFERENCE TO RELATED APPLICATIONS

This application is a continuation of International Application No. PCT/CN2016/113341, filed on Dec. 30, 2016, which claims priority to Chinese Patent Application No. 201610156672.0, filed on Mar. 18, 2016. The disclosures of the aforementioned applications are hereby incorporated by reference in their entireties.

TECHNICAL FIELD

This application relates to the communications field, and more specifically, to a super-cell handover method and apparatus.

BACKGROUND

Currently, in a Long Term Evolution (LTE) system, a base station may deliver measurement configuration to user equipment (UE), and the UE sends a measurement report to the base station based on the measurement configuration. The base station determines, based on the measurement report that is reported by the UE, whether to control to hand over the UE between cells, and controls to hand over a terminal using an air interface resource.

With reference to FIG. 1, the following describes in detail a process in which the base station controls to hand over the UE between cells. FIG. 1 is a schematic flowchart in which a base station controls to hand over connected UE between cells in a current system.

S101. A source cell base station sends measurement information to the UE, where the measurement information carries measurement configuration information, and the measurement information is used to instruct the UE to receive a downlink reference signal based on measurement configuration.

S102. The UE sends a measurement report to the source cell base station, where the measurement report is used to indicate a measurement result of the downlink reference signal received by the UE.

S103. The source cell base station determines, based on the measurement report that is reported by the UE, to hand over the UE to a target cell.

S104. The source cell base station sends a handover request message to a target cell base station, where the handover request message carries service information of the UE, so as to request the target cell base station to configure a resource for the UE.

S105. The target cell base station determines that the UE is allowed to be handed over to the target cell, and configures a radio resource for the UE based on the service information of the UE.

S106. The target cell base station sends a handover response to the source cell base station, where the handover response carries information about the radio resource configured for the UE, so as to notify the source cell base station that the UE is allowed to be handed over to the target cell.

S107. The source cell base station sends a handover notification to the UE, where the handover notification carries the information about the radio resource configured by the target cell base station for the UE.

S108. The UE synchronizes with the target cell base station based on the handover notification.

In other words, when the UE moves from one cell to another cell, the UE needs to cooperate with a network to perform signal measurement and handover.

However, development of a 5G network starts a trend towards high-density cell deployment. A mobile subscriber is frequently handed over, and a handover operation is frequently performed between the network and UE. As a result, a tremendous waste of network signaling and air interface resources is caused.

Therefore, a technology needs to be provided to reduce the tremendous waste of network signaling and air interface resources caused when the UE is handed over between cells.

SUMMARY

Embodiments of this application provide a super-cell handover method and apparatus, so as to reduce signaling overheads caused when UE is handed over between cells, and reduce air interface resource consumption.

According to a first aspect, an embodiment of this application provides a super-cell handover method. The method is applied to a no cell system, the no cell system includes at least two super cells. Each super cell includes a plurality of transmission points (TP) and one logical entity (LE), the at least two super cells include a first super cell and a second super cell, and the first super cell is adjacent to the second super cell. The method includes receiving, by a first LE, measurement reports sent by a plurality of first TPs, where the measurement reports are measurement reports determined by the plurality of first TPs based on a reference signal sent by target user equipment UE in the second super cell, the first LE is an LE in the first super cell, and the plurality of first TPs are TPs in the first super cell. The method further includes determining, by the first LE, a first handover policy based on a first preset condition and the measurement reports, where the first handover policy is used to indicate whether the first LE allows to hand over the target UE from the second super cell to the first super cell. The method further includes sending, by the first LE, indication information of the first handover policy to a second LE, where the indication information is used to instruct the second LE to perform handover processing based on the first handover policy, and the second LE is an LE in the second super cell.

Optionally, each super cell may include one or more LEs.

The plurality of first TPs measure the reference signal sent by the target UE in the second super cell, and send the measurement reports to the first LE. The first LE determines, based on the measurement reports sent by the plurality of first TPs and the first preset condition, whether to hand over the target UE to the first super cell, thereby implementing a super-cell handover of the target UE. Compared with a cell handover method in a current method, this method may resolve a problem that frequent handovers in a high-density cell deployment scenario consume signaling overheads and air interface resources. In addition, first information used for channel measurement in the first super cell is sent to the target UE before the handover of the target UE, so that the target UE is smoothly handed over between the super cells. In addition, the first LE determines whether the target UE is allowed to be handed over to the first super cell. The LE in the first super cell may make a more accurate and reasonable decision because the first LE understands better a load status in the super cell.

With reference to the first aspect, in a first possible implementation of the first aspect, the plurality of first TPs include at least one neighboring cell TP, and each of the at least one neighboring cell TP is adjacent to the second super cell. In addition, the receiving, by a first LE, measurement reports sent by a plurality of first TPs includes: receiving, by the first LE, a measurement report sent by the at least one neighboring cell TP.

Further, the plurality of first TPs include at least one neighboring cell TP of an edge TP, and a distance between each of the at least one neighboring cell TP and the edge TP falls within a first preset range. The edge TP is a TP located on an edge of the second super cell.

Second information is selectively sent to a TP in the first super cell, to be specific, the second information is sent to the TP in the first preset range, so as to reduce a workload of a TP that is in the first super cell and that is relatively far away from the second super cell.

With reference to the foregoing possible implementation of the first aspect, in a second possible implementation of the first aspect, the first preset condition may include a condition in which a signal strength of the reference signal of the target UE received by at least one of the plurality of first TPs is greater than signal strength of the reference signal that is received by any TP in the second super cell and that is sent by the target UE. The first preset condition may also include a condition in which a quantity of target TPs in the first super cell is greater than a quantity of target TPs in the second super cell, and the target TP is a TP receiving the reference signal that is sent by the target UE and whose signal quality is greater than a preset service threshold. The first preset condition may also include a condition in which a signal quality of the reference signal that is received by at least one of the plurality of first TPs and that is sent by the target UE is greater than a preset service threshold, and load of the first LE is less than load of the second LE. The first preset condition may also include a condition in which positioning information of the target UE indicates that the target UE is located in an area of the second super cell.

A plurality of preset conditions are set, so that a super-cell handover condition of the target UE is more flexible.

With reference to the foregoing possible implementations of the first aspect, in a third possible implementation of the first aspect, when the first handover policy indicates that the first LE allows to hand over the target UE to the first super cell, the indication information of the first handover policy is a handover notification, and the method further includes: receiving, by the first LE, a handover response sent by the second LE based on the handover notification, where the handover response is determined by the second LE based on measurement reports sent by a plurality of second TPs and a second preset condition, the handover response is used to notify the first LE that the second LE allows to hand over the target UE to the first super cell, and the plurality of second TPs are TPs in the second super cell. The method further includes sending, by the first LE based on the handover response, first information used for channel measurement to the target UE, where the first information includes a user identifier and a tracking channel resource of the target UE in the first super cell, or includes a pilot resource of the target UE in the first super cell.

The first LE and the second LE jointly determine whether to hand over the UE to the first super cell, so as to reduce signaling overheads caused when an LE in each super cell sends, to an LE in an adjacent super cell, a measurement report that is reported by a TP in the super cell.

With reference to the foregoing possible implementations of the first aspect, in a fourth possible implementation of the first aspect, when the first handover policy indicates that the first LE allows to hand over the target UE to the first super cell, the indication information of the first handover policy is a handover notification, and the method further includes: receiving, by the first LE, an access request sent by the target UE, where the access request is sent by the target UE based on the handover notification sent by the second LE. The method further includes after the target UE accesses the first super cell, sending, by the first LE, first information used for channel measurement to the target UE, where the first information includes a user identifier and a tracking channel resource of the target UE in the first super cell, or includes a pilot resource of the target UE in the first super cell.

Connected UE is handed over before the first information is sent, so as to reduce signaling overheads caused when the first LE forwards the first information to the target UE using the second LE.

According to a second aspect, an embodiment of this application provides a super-cell handover method. The method is applied to a no cell system, the no cell system includes at least two super cells, each super cell includes a plurality of transmission points (TP) and one logical entity (LE), the at least two super cells include a first super cell and a second super cell, and the first super cell is adjacent to the second super cell. The method includes: determining, by a second LE based on measurement reports sent by a plurality of second TPs, that a serving TP of target user equipment UE located in the second super cell is an edge TP, where the second LE is an LE in the second super cell, the plurality of second TPs are TPs in the second super cell, and the edge TP is a TP located on an edge of the second super cell. The method further includes sending, by the second LE, second information used for channel measurement to a plurality of first TPs, where the second information is used to instruct the plurality of first TPs to receive, based on the second information, a reference signal sent by the target UE, and the plurality of first TPs are TPs in the first super cell.

When the edge TP is preset and used as the serving TP of the target UE, the second information used for channel measurement is sent to a TP in the adjacent first super cell, so that the plurality of first TPs may receive, based on the second information, the reference signal sent by the target UE. Therefore, a first LE determines, based on measurement reports sent by the plurality of first TPs, whether the target UE is allowed to be handed over from the second super cell to the first super cell. Compared with a cell handover method in a current method, this method may resolve a problem that frequent handovers in a high-density cell deployment scenario consume signaling overheads and air interface resources.

With reference to the second aspect, in a first possible implementation of the second aspect, the plurality of first TPs include at least one neighboring cell TP, and a distance between each of the at least one neighboring cell TP and the edge TP falls within a first preset range, and the sending, by the second LE, second information used for channel measurement to a plurality of first TPs includes: sending, by the second LE, the second information to each of the at least one neighboring cell TP, where the second information is used to instruct each of the at least one neighboring cell TP to receive, based on the second information, the reference signal sent by the target UE.

The second information is selectively sent to a TP in the first super cell, to be specific, the second information is sent to the TP in the first preset range, so as to reduce a workload of a TP that is in the first super cell and that is relatively far away from the edge TP.

With reference to the second aspect, in a second possible implementation of the second aspect, the sending, by the second LE, the second information to each of the at least one neighboring cell TP includes: forwarding, by the second LE, the second information to each of the at least one neighboring cell TP using the first LE.

With reference to the second aspect, in a third possible implementation of the second aspect, the method further includes: receiving, by the second LE, a handover notification sent by the first LE, where the handover notification is determined by the first LE based on a measurement report sent by the neighboring cell TP. The method further includes determining, by the second LE based on a second preset condition and the measurement reports sent by the plurality of second TPs, that the target UE is allowed to be handed over to the first super cell. The method further includes sending, by the second LE, a handover response to the first LE based on the handover notification. The method further includes receiving, by the second LE, first information that is sent by the first LE based on the handover response and that is used for channel measurement, where the first information includes a user identifier and a tracking channel resource of the target UE in the first super cell, or includes a pilot resource of the UE in the first super cell.

The LE in either of the two super cells determines, with reference to the measurement reports sent by the TPs in the super cell, whether the UE is allowed to be handed over from the second super cell to the first super cell, so as to reduce signaling interaction caused when the first LE sends a measurement report to the second LE or when the second LE sends a measurement report to the first LE, thereby reducing signaling overheads.

With reference to the second aspect, in a fourth possible implementation of the second aspect, the second preset condition may include a condition in which a signal strength of the reference signal of the target UE received by at least one of the plurality of first TPs is greater than signal strength of the reference signal that is received by any TP in the second super cell and that is sent by the target UE. The second preset condition may also, or alternatively, include a condition in which a quantity of target TPs in the first super cell is greater than a quantity of target TPs in the second super cell, and the target TP is a TP receiving the reference signal that is sent by the target UE and whose signal quality is greater than a preset service threshold. The second preset condition may also, or alternatively, include a condition in which a signal quality of the reference signal that is received by at least one of the plurality of first TPs and that is sent by the target UE is greater than a preset service threshold, and load of the first LE is less than load of the second LE. The second preset condition may also, or alternatively, include a condition in which a positioning information of the target UE indicates that the target UE is located in an area of the second super cell.

A plurality of preset conditions are set, so that a super-cell handover condition of the target UE is more flexible.

According to a third aspect, an embodiment of this application provides a super-cell handover method. The method is applied to a no cell system, the no cell system includes at least two super cells, each super cell includes a plurality of transmission points TP and one logical entity LE, the at least two super cells include a first super cell and a second super cell, and the first super cell is adjacent to the second super cell. The method includes sending, by an edge TP, a measurement report to a second LE, where the measurement report is a measurement report determined by the edge TP based on a reference signal of target user equipment UE in the second super cell, the second LE is an LE in the second super cell, and the edge TP is a TP located on an edge of the second super cell. The method further includes receiving, by the edge TP, a service notification sent by the second LE, where the service notification is used to notify that the edge TP is a serving TP of the target UE. The method further includes sending, by the edge TP based on the service notification, second information used for channel measurement to a plurality of first TPs, where the second information is used to instruct the plurality of first TPs to receive, based on the second information, the reference signal sent by the target UE, and the plurality of first TPs are TPs in the first super cell.

When the edge TP is preset and used as the serving TP of the target UE, the second information used for channel measurement is sent to a TP in the adjacent first super cell, so that the plurality of first TPs may receive, based on the second information, the reference signal sent by the target UE. Therefore, a first LE determines, based on measurement reports sent by the plurality of first TPs, whether the target UE is allowed to be handed over from the second super cell to the first super cell. Compared with a cell handover method in the current method, this method may resolve a problem that frequent handovers in a high-density cell deployment scenario consume signaling overheads and air interface resources.

With reference to the third aspect, in a first possible implementation of the third aspect, the plurality of first TPs include at least one neighboring cell TP, and a distance between each of the at least one neighboring cell TP and the edge TP falls within a first preset range; and the sending, by the edge TP based on the service notification, second information used for channel measurement to a plurality of first TPs includes: sending, by the edge TP, the second information to each of the at least one neighboring cell TP based on the service notification.

The second information is selectively sent to a TP in the first super cell, to be specific, the second information is sent to the TP in the first preset range, so as to reduce a workload of a TP that is in the first super cell and that is relatively far away from the edge TP.

With reference to the foregoing possible implementation of the third aspect, in a second possible implementation of the third aspect, the sending, by the edge TP, the second information to each of the at least one neighboring cell TP based on the service notification includes: sending, by the edge TP, the second information to each of the at least one neighboring cell TP based on the service notification using the second LE and a first LE.

According to a fourth aspect, an embodiment of this application provides a super-cell handover apparatus, configured to perform the method in the first aspect or any possible implementation of the first aspect. Specifically, the apparatus includes units configured to perform the method in the first aspect or any possible implementation of the first aspect.

According to a fifth aspect, an embodiment of this application provides a super-cell handover apparatus, configured to perform the method in the second aspect or any possible implementation of the second aspect. Specifically, the apparatus includes units configured to perform the method in the second aspect or any possible implementation of the second aspect.

According to a sixth aspect, an embodiment of this application provides a super-cell handover apparatus, configured to perform the method in the third aspect or any possible implementation of the third aspect. Specifically, the apparatus includes units configured to perform the method in the third aspect or any possible implementation of the third aspect.

According to a seventh aspect, an embodiment of this application provides a super-cell handover device, and the device includes a receiver, a transmitter, a memory, a processor, and a bus system. The receiver, the transmitter, the memory, and the processor are connected to each other using the bus system. The memory is configured to store an instruction. The processor is configured to execute the instruction stored in the memory, to control the receiver to receive a signal and control the transmitter to send a signal. In addition, when the processor executes the instruction stored in the memory, the execution enables the processor to perform the method in the first aspect or any possible implementation of the first aspect.

According to an eighth aspect, an embodiment of this application provides a super-cell handover device, and the device includes a receiver, a transmitter, a memory, a processor, and a bus system. The receiver, the transmitter, the memory, and the processor are connected to each other using the bus system. The memory is configured to store an instruction. The processor is configured to execute the instruction stored in the memory, to control the receiver to receive a signal and control the transmitter to send a signal. In addition, when the processor executes the instruction stored in the memory, the execution enables the processor to perform the method in the second aspect or any possible implementation of the second aspect.

According to a ninth aspect, an embodiment of this application provides a super-cell handover device, and the device includes a receiver, a transmitter, a memory, a processor, and a bus system. The receiver, the transmitter, the memory, and the processor are connected to each other using the bus system. The memory is configured to store an instruction. The processor is configured to execute the instruction stored in the memory, to control the receiver to receive a signal and control the transmitter to send a signal. In addition, when the processor executes the instruction stored in the memory, the execution enables the processor to perform the method in the third aspect or any possible implementation of the third aspect.

According to a tenth aspect, an embodiment of this application provides a computer-readable medium, configured to store a computer program, and the computer program includes an instruction used to execute the method in the first aspect or any possible implementation of the first aspect.

According to an eleventh aspect, an embodiment of this application provides a computer-readable medium, configured to store a computer program, and the computer program includes an instruction used to execute the method in the second aspect or any possible implementation of the second aspect.

According to a twelfth aspect, an embodiment of this application provides a computer-readable medium, configured to store a computer program, and the computer program includes an instruction used to execute the method in the third aspect or any possible implementation of the third aspect.

The embodiments of this application provide the super-cell handover method and apparatus, so as to reduce signaling overheads caused when the UE is handed over between cells, and reduce air interface resource consumption.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
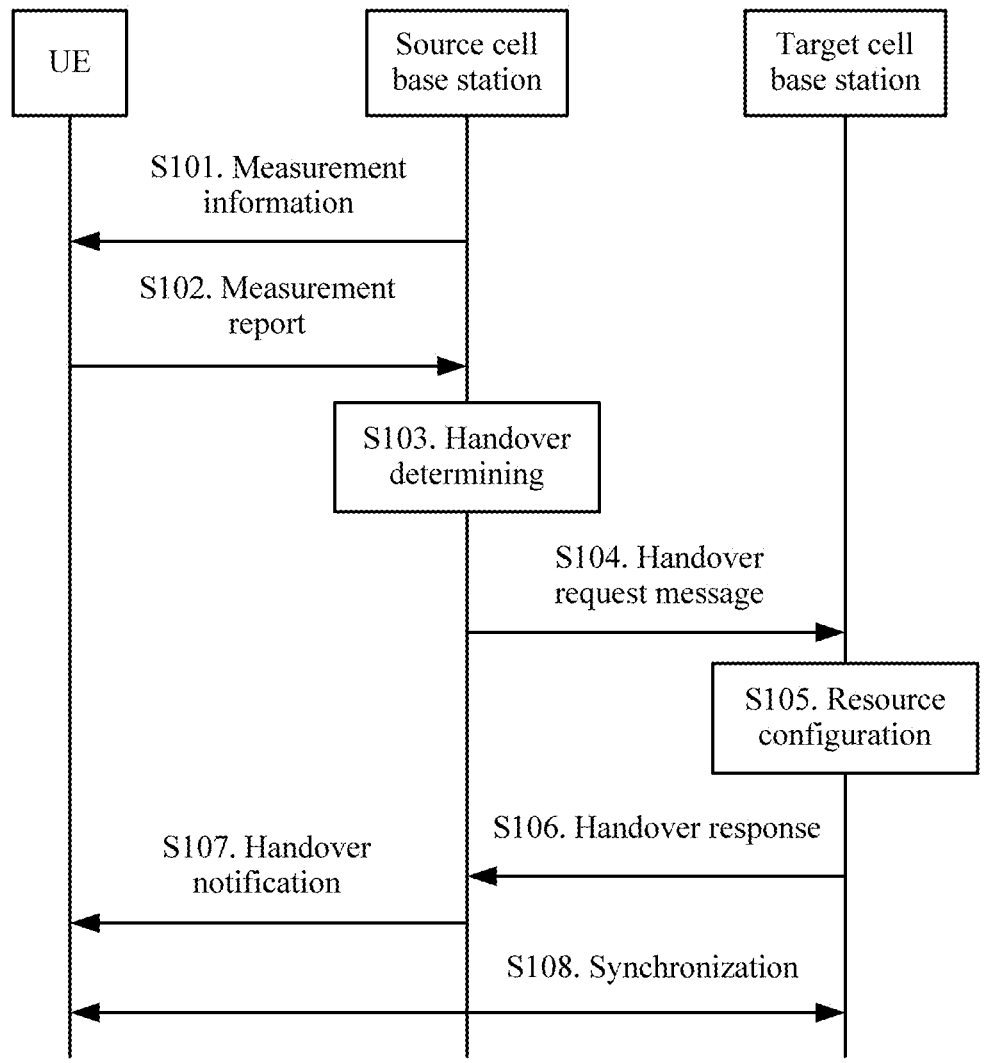
FIG. 1 is a schematic flowchart in which a base station controls to hand over connected UE between cells in a current system.

The following clearly describes the technical solutions in the embodiments of this application with reference to the accompanying drawings in the embodiments of this application.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate using a local and/or remote process and according to, for example, a signal having one or more data packets (for example, data from two components interacting with another component in a local system, a distributed system, and/or across a network such as the Internet interacting with other systems using the signal).

It should be understood that the technical solutions of this application may be applied to various communications systems, such as: Global System for Mobile Communications (GSM), a Code Division Multiple Access (CDMA) system, a Wideband Code Division Multiple Access (WCDMA)

system, a general packet radio service (GPRS), a Long Term Evolution (LTE) system, a Long Term Evolution Advanced (LTE-A) system, Universal Mobile Telecommunications System (UMTS), and a 5G system.

It should be further understood that in the embodiments of this application, user equipment (UE) includes but is not limited to a mobile station (MS), a mobile terminal, a mobile telephone, a handset, portable equipment, and the like. The user equipment may communicate with one or more core networks using a radio access network (RAN). For example, the user equipment may be a mobile telephone, a "cellular" phone, or a computer having a wireless communication function, or the user equipment may be a portable, pocket-sized, handheld, computer built-in, or in-vehicle mobile apparatus.

To resolve a problem with a current system of a tremendous waste of signaling overheads and air interface resources caused when UE is handed over between cells, the embodiments of this application first introduce a network architecture of a no cell system (NCS). The NCS includes one or more super cells (also referred to as a cell cluster or a logical cell). In addition, an idea of "network follows UE" is proposed based on the NCS, to perform mobility management on the UE. Based on a super cell, two states of the UE are defined in the embodiments of this application: an economical (ECO) state and an active state. The ECO state is a new state in the NCS, and is described in detail in the following. It should be noted that the NCS may further include UE in an idle state.

Figure 2:
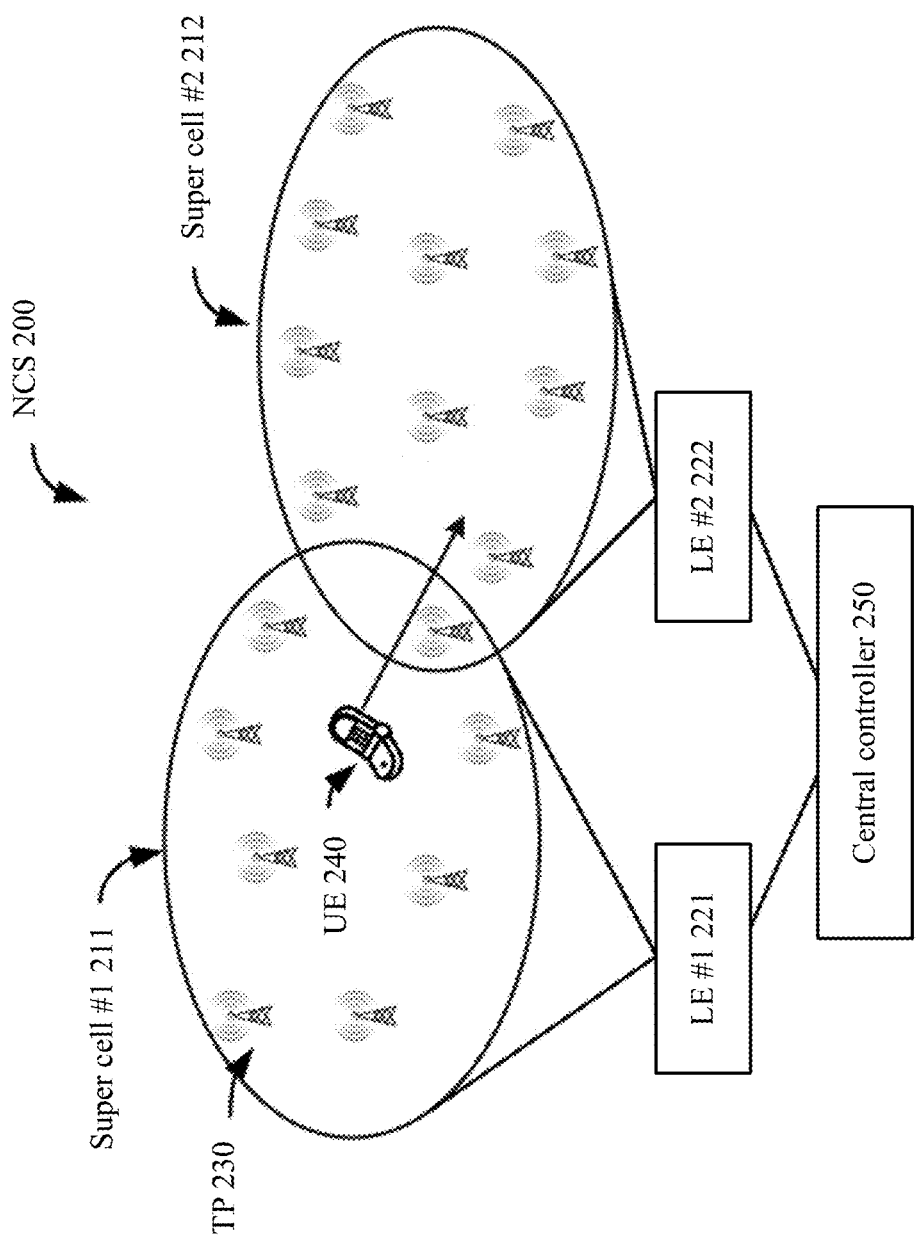
FIG. 2 is a schematic diagram of a network architecture of an NCS.

With reference to FIG. 2, the following describes a network architecture of an NCS in detail.

FIG. 2 is a schematic diagram of a network architecture of an NCS. As shown in FIG. 2, an NCS 200 includes a plurality of super cells, for example, a super cell #1 211 and a super cell #2 212. Each super cell corresponds to at least one logical entity (LE). For example, the super cell #1 211 corresponds to an LE #1 221, and the super cell #2 212 corresponds to an LE #2 222. Each LE controls a transmission point (TP) 230 in the super cell. UE 240 performs uplink and downlink transmission with one or more TPs of the LE. The LE may be controlled by a central controller 250. In this embodiment of this application, the central controller 250 may simultaneously control the LE #1 221 and the LE #2 222; or may simultaneously control other LEs. Alternatively, the LE #1 221 and the LE #2 222 may be controlled by different central controllers. This application imposes no special limitation thereto.

It should be noted that a specific type of the TP is not limited in this embodiment of this application. For example, the TP may be an ordinary base station (such as a NodeB or an eNB), a remote radio unit, a micro base station (pico), or a relay or any other radio access device.

It should be further noted that the NCS may indicate that UE sends a reference signal, and an LE in a super cell in which the UE is located continually updates and maintains the reference signal, and provides the UE with a TP used for a data communication service, so that the UE does not sense a change of the TP as much as possible. It should be understood that the "cell" herein is a normal cell in a current system, and one cell may correspond to one TP. It can also be understood that the NCS in this application is a network system including one or more super cells.

It should be further noted that each super cell may include one or more LEs. In other words, the TP in each super cell may be controlled by one or more LEs. This application imposes no special limitation thereto.

In this embodiment of this application, each super cell may have a super cell identifier (ID), namely, a hyper cell ID. IDs of TPs (or cells) located in a same super cell may be consistent with the hyper cell ID. Further, public information of TPs in the super cell may be configured to be consistent. For example, a synchronization channel, a downlink reference channel, a broadcast channel, and the like send same content. When the UE moves in the super cell, the UE does not sense a change of a serving cell because the public information of the TPs in the super cell is the same. Specifically, the UE does not need to measure a downlink reference signal sent by each TP in the super cell, and instead, the UE sends an uplink reference signal, and a network side measures the uplink reference signal of the UE, and selects, based on a measurement result, one or more TPs for the UE to perform data transmission. To be specific, in a process in which the UE moves in the super cell, the network side may measure the uplink reference signal, and complete a TP handover, so that the UE does not sense a TP change as much as possible. In other words, a "no cell" concept is introduced. Therefore, not only service continuity can be ensured, but also air interface signaling overheads can be reduced. The UE does not need to bear a heavy burden of measurement, and design complexity is also accordingly reduced.

Based on the NCS, an economical (ECO) state is introduced for the UE in the super cell, and ECO UE includes some or all of the following functions.

1. The UE is in a radio resource control—connected (RRC-Connected) state. This is different from an idle state in a current system.

2. The UE does not monitor and receive a physical downlink control channel (PDCCH). This is also different from a connected state in a current system.

3. The UE sends an uplink tracking signal on an uplink tracking channel, so that the TP can perform measurement and tracking positioning.

4. The UE may support uplink grant free transmission.

Unless otherwise described, the following uses UE to indicate ECO UE and active UE.

In this embodiment of this application, a sequence ID and a corresponding tracking channel resource are configured for the UE in a network. When the UE is in an ECO state, the UE sends the sequence ID on the tracking channel, so that the UE may be tracked in the network. Alternatively, the sequence ID may be understood as the uplink reference signal of the ECO UE. When the UE is in an active state, the TP may detect the sequence ID of the UE based on configuration, so as to identify the UE; and measure an uplink pilot signal sent by the UE. The UE may keep the sequence ID and the tracking channel resource unchanged in a super cell (for example, the super cell #1). However, a sequence ID and a tracking channel resource need to be allocated to the UE again when the UE is handed over to another super cell (for example, the super cell #2). Unless otherwise described, the following uses the reference signal to indicate a sequence ID of ECO UE and an uplink pilot signal of active UE.

It should be noted that when the UE is in a super cell, the sequence ID and the tracking channel resource allocated by the LE to the UE may remain unchanged, or may be changed. For example, a super cell may be divided into a plurality of areas, and the LE may allocate different sequence IDs and tracking channel resources to the UE when the UE is located in different areas. The LE may allocate the sequence ID and the tracking channel resource to the UE based on a user type. The LE may also allocate an unchanged sequence ID and tracking channel resource to a fast moving user. The LE may further allocate different sequence IDs and tracking channel resources to a slow moving user based on different areas. For another example, when the UE switches from the ECO state to the active state, an original sequence ID and tracking channel resource may be released, and may be tracked by sending a pilot signal. After the UE switches from the active state to the ECO state, the LE may allocate a new sequence ID and tracking channel resource to the UE again. It should be understood that a sequence ID changing status of the UE in a same super cell enumerated herein is merely an example for description, and shall not constitute any limitation on this application. This application shall not be limited thereto. For example, when the UE switches from the ECO state to the active state, an original sequence ID and tracking channel resource may not be released, and the sequence ID is used as an identifier of the UE. When the UE switches from the active state to the ECO state again, the original sequence ID and tracking channel resource are still used, and the sequence ID is sent based on the tracking channel resource.

It should be understood that both the sequence ID and the pilot signal enumerated above may be the reference signal in this embodiment of this application. When the UE is in different states, the reference signal has different forms. The sequence ID and the pilot signal are merely examples for description, and shall not constitute any limitation on this application.

It should be further understood that the foregoing method for allocating, by the LE, the sequence ID and the tracking channel resource to the UE is merely an example for description, and shall not constitute any limitation on this application. This application shall not be limited thereto.

Further referring to FIG. 2, when the UE is in the super cell #1, data of the UE may be transmitted or a communication service may be provided for the UE using a TP set formed by TPs in the super cell #1. When the UE is handed over from the super cell #1 to the super cell #2, a communication service may be provided for the UE using a TP set formed by TPs in the super cell #2. To be specific, when the UE moves, a TP that transmits data for the UE may be continually updated, and the LE allocates, to the UE based on signal quality of the reference signal of the UE received by each TP, a TP (denoted as a serving TP below for ease of understanding) used to provide the communication service. However, when the UE is handed over from the super cell #1 to the super cell #2, how to perform a super-cell handover based on the reference signal of the UE becomes an urgent technical problem to be resolved.

Figure 3:
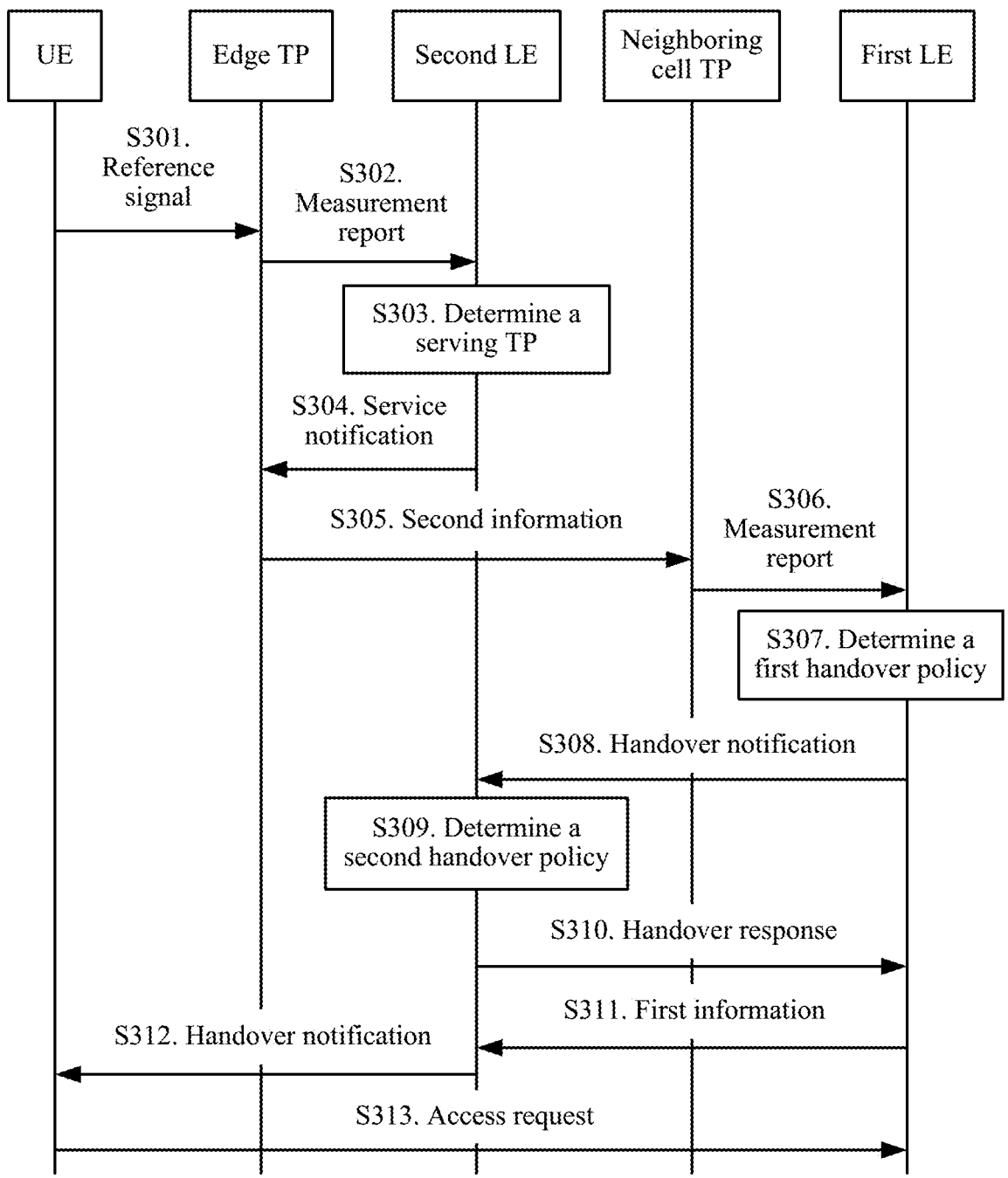
FIG. 3 is a schematic flowchart of a super-cell handover method according to an embodiment of this application.
Figure 4:
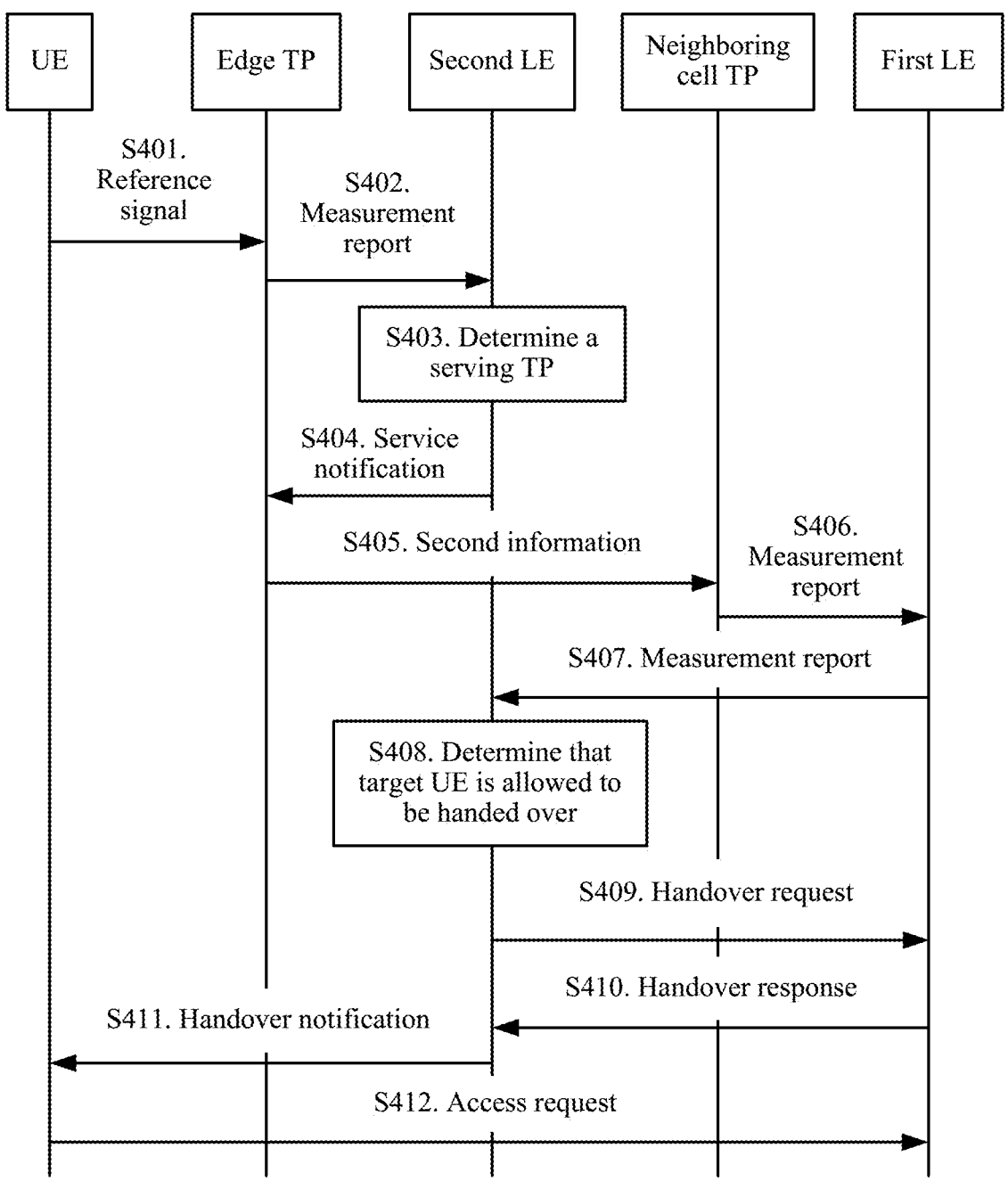
FIG. 4 is a schematic flowchart of a super-cell handover method according to another embodiment of this application.
Figure 5:
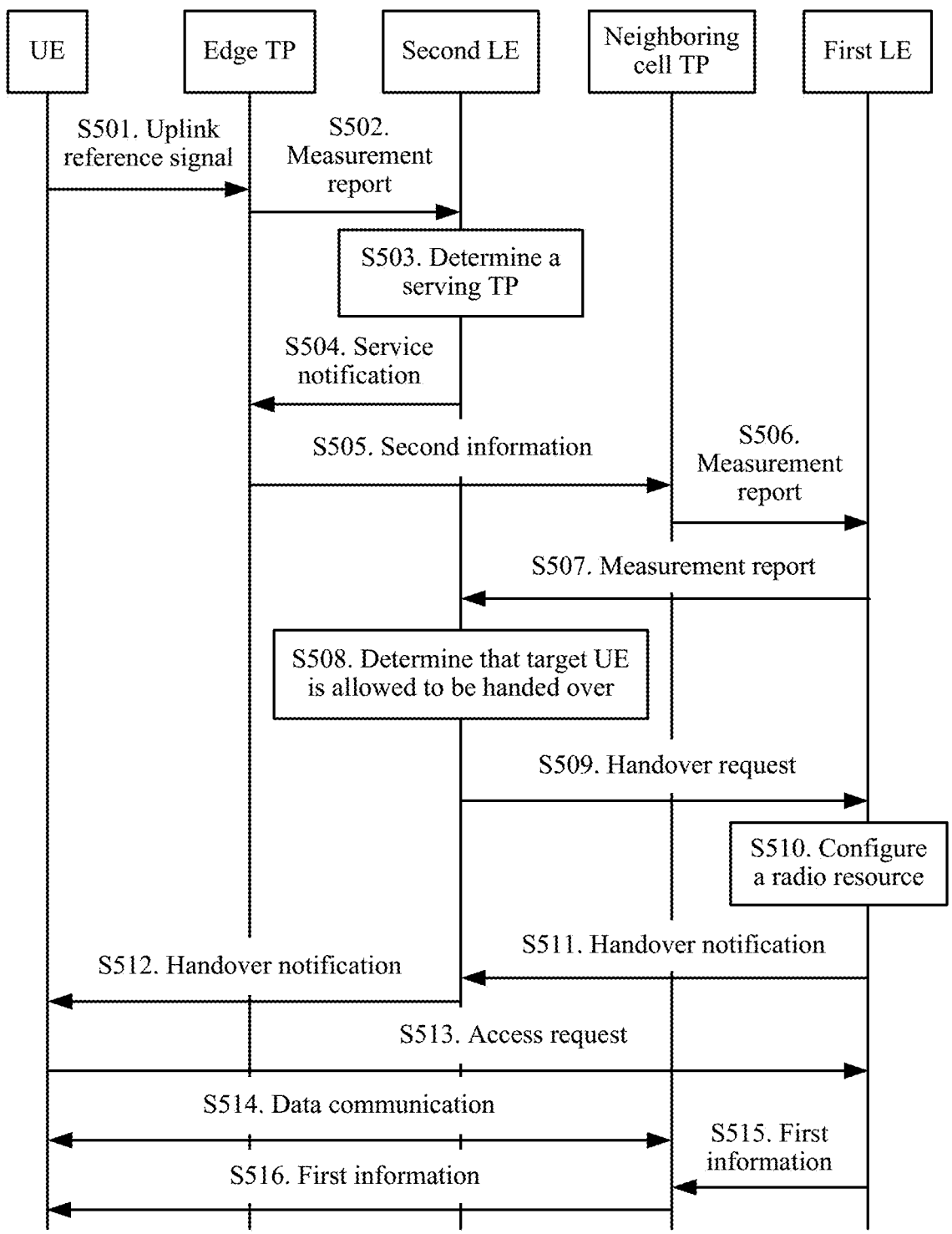
FIG. 5 is a schematic flowchart of a super-cell handover method according to still another embodiment of this application.

With reference to FIG. 3 to FIG. 5, the following describes in detail super-cell handover methods according to embodiments of this application.

It should be understood that "handover" in the embodiments of this application may be "changing a serving super cell", and the "handover" is merely used as an example for description in the embodiments of this application, and shall not constitute any limitation on this application. The embodiments of this application do not exclude another name used to express "changing a serving super cell". Unless otherwise described, the following methods in the embodiments of this application may be applicable to ECO UE and active UE.

It should be further understood that FIG. 3 to FIG. 5 show steps or operations used for a super-cell handover according to the embodiments of this application, but the steps or operations are merely examples. In the embodiments of this application, other operations or variations of various operations in FIG. 3 to FIG. 5 may be performed. In addition, the steps in FIG. 3 to FIG. 5 may be performed in an order different from the order presented in FIG. 3 to FIG. 5, and not all operations in FIG. 3 to FIG. 5 need to be performed in some cases.

It should be further understood that a first super cell enumerated in FIG. 3 to FIG. 5 may correspond to the super cell #2 in FIG. 2, and a first LE and a plurality of first TPs in the first super cell may correspond to an LE and TPs in the super cell #2 in FIG. 2. A second super cell enumerated in FIG. 3 to FIG. 5 may correspond to the super cell #1 in FIG. 2, and a second LE and a plurality of second TPs in the second super cell may correspond to an LE and TPs in the super cell #1 in FIG. 2.

FIG. 3 is a schematic flowchart of a super-cell handover method 300 according to an embodiment of this application. As shown in FIG. 3, the method 300 includes the following steps.

S301. Target UE in a second super cell sends a reference signal.

Specifically, UE (denoted as the target UE below for ease of understanding and differentiation) in the second super cell may send a reference signal based on a resource allocated by a second LE. The target UE may be in an ECO state, or may be in an active state. When the UE is in different states, the UE sends different reference signals, and different resources are allocated for reference signal sending. Specifically, when the target UE is in the second super cell, an LE (denoted as the second LE below for ease of understanding and differentiation) in the second super cell may allocate a sequence ID and a tracking channel resource to the UE. When the UE is in the ECO state, the UE may send the sequence ID based on the tracking channel resource, and use the sequence ID as the reference signal. When the UE is in the active state, the UE may directly send a pilot signal, and use the sequence ID as an identifier of the UE.

In this embodiment of this application, the second LE may send second information used for channel measurement to all TPs (denoted as a plurality of second TPs below for ease of understanding and differentiation) in the second super cell. Specifically, the second information may include information about the sequence ID and the tracking channel resource of the target UE in the second super cell, or information about a pilot resource of the target UE in the second super cell. The second information is allocated by the second LE in the second super cell to each UE, and is sent to the plurality of second TPs in the second super cell, so that each TP receives, based on the second information, the reference signal sent by the target UE. It should be understood that the second information includes but is not limited thereto. The second information may further include information about another radio resource configured by the second LE for the target UE, so as to perform data communication of the target UE in the second super cell. This application imposes no special limitation thereto. It should be understood that, using the foregoing enumerated sequence ID and pilot signal as the reference signal is merely an example for description, and shall not constitute any limitation on this application. Using the sequence ID, the tracking channel resource, and the pilot resource corresponding to the pilot signal as specific content of the second information is merely an example for description, and shall not constitute any limitation on this application. This application shall not be limited thereto. Other information used for channel measurement falls within the protection scope of this application.

S302. A plurality of second TPs send measurement reports to a second LE.

The TP in the second super cell receives, on a corresponding channel based on the second information sent by the second LE, the reference signal sent by the target UE, and reports the measurement report to the second LE. The measurement report may include positioning information of the UE, information about UE signal quality measured by the TP such as a reference signal received power (RSRP), a received signal strength indicator (RSSI), reference signal received quality (RSRQ), a reference signal-carrier-to-interference-and-noise ratio (RS-CINR), and the like. For example, the measurement reports may include signal quality of the reference signal of the target UE received by the plurality of second TPs.

In this embodiment of this application, specifically, when the target UE is in the ECO state, the plurality of second TPs receive the sequence ID of the target UE based on the tracking channel resource. Additionally or alternatively, when the target UE is in a connected state, the plurality of second TPs receive the pilot signal of the target UE based on the pilot resource.

In this embodiment of this application, a TP located on an edge of the second super cell is used as an edge TP. Specifically, a distance between the edge TP and the second LE falls within a second preset range. The second preset range may be understood as an interval of a distance between the edge TP and the second LE. For example, the distance S between the edge TP and the second LE may fall within [M, N], where N is a maximum distance between the second LE and a network of the second super cell, and M may be a preset value. Any TP whose distance from the second LE falls within [M, N] may be used as the edge TP. In other words, there may be one or more edge TPs. In other words, the edge TP is a subset of the plurality of second TPs.

Therefore, that a plurality of second TPs send measurement reports to a second LE includes: sending, by the edge TP, a measurement report to the second LE.

S303. The second LE determines a serving TP of the target UE.

The second LE compares the measurement reports sent by the plurality of second TPs, and determines that one or more TPs receiving a best-quality reference signal of the target UE are the serving TP of the target UE. Optionally, the second LE may determine the serving TP based on a preset service threshold. To be specific, the second LE may determine, based on the measurement reports sent by the plurality of second TPs, that a TP receiving the reference signal that is sent by the target UE and whose signal quality is greater than or equal to the preset service threshold is the serving TP of the target UE. It should be understood that there may be one or more serving TPs of the target UE.

It should be noted that the second LE may control and manage all the TPs in the second super cell, but cannot control or manage a TP in another super cell. In other words, a TP in each super cell can only be controlled and managed by an LE in the super cell.

S304. The second LE sends a service notification to the serving TP.

After determining the serving TP of the target UE, the second LE may send the service notification to the determined serving TP, so as to notify that the serving TP is the serving TP of the target UE. Specifically, the service notification may include the sequence ID of the target UE.

In this embodiment of this application, the second LE determines that the edge TP is the serving TP of the target UE. Therefore, the second LE sends the service notification to the edge TP.

S305. An edge TP sends second information to a plurality of first TPs.

After the edge TP receives the service notification, the edge TP determines that the edge TP itself is the serving TP of the target UE. In addition, the edge TP sends the second information to TPs (denoted as the plurality of first TPs below for ease of understanding and differentiation) in the first super cell, and the second information is used to instruct the plurality of first TPs to receive the reference signal sent by the target UE.

Optionally, the edge TP may forward the second information to the first LE using the second LE, so that the first LE notifies the plurality of first TPs of the second information. Therefore, the plurality of first TPs receive the reference signal of the target UE based on the second information.

Alternatively, when the second LE determines that the edge TP is the serving TP of the target UE, the second information may be directly forwarded to the first LE, so that the first LE notifies the plurality of first TPs of the second information. Therefore, the plurality of first TPs receive the reference signal of the target UE based on the second information.

In this embodiment of this application, there are a relatively large quantity of TPs in the first super cell, and a TP that is relatively far away from the second super cell receives a relatively weak reference signal of the target UE. Therefore, the second information may be selectively sent to a TP in the plurality of first TPs.

Optionally, the plurality of first TPs include at least one neighboring cell TP, and each of the at least one neighboring cell TP is adjacent to the second super cell.

Further, the at least one neighboring cell TP is a neighboring cell TP of the edge TP, and a distance between each of the at least one neighboring cell TP and the edge TP falls within a first preset range. It should be understood that the first preset range may be a preset range, for example, may be determined based on factors such as a condition of communication between the edge TP and the neighboring cell TP, and signal quality during communication between TPs. This application imposes no limitation thereto. That an edge TP sends second information to a plurality of first TPs in S305 includes: sending, by the edge TP, the second information to each of the at least one neighboring cell TP.

In this embodiment of this application, a network operator may preset the edge TP, and determine, based on a geographic location of the edge TP, that a TP that is in the first super cell and whose distance from the edge TP falls within the first preset range is the neighboring cell TP. It should be understood that there may be one or more neighboring cell TPs. One edge TP may correspond to one neighboring cell TP, or may correspond to a plurality of neighboring cell TPs.

Optionally, the edge TP may pre-store information about the neighboring cell TP corresponding to the edge TP.

For example, the edge TP may pre-store an ID of the neighboring cell TP corresponding to the edge TP. After receiving the service notification, the edge TP may send, based on the ID of the neighboring cell TP corresponding to the edge TP, the second information to the neighboring cell TP corresponding to the edge TP, so that the neighboring cell TP corresponding to the edge TP receives the reference signal of the target UE based on the second information.

Optionally, the edge TP may send the information about the neighboring cell TP corresponding to the edge TP to the second LE, so that the second LE forwards the information about the neighboring cell TP corresponding to the edge TP and the second information to the first LE. Therefore, the neighboring cell TP corresponding to the edge TP receives the reference signal of the target UE based on the second information.

Optionally, the second LE may pre-store a correspondence between an edge TP and a neighboring cell TP.

When the second LE determines that the edge TP is the serving TP of the target UE, the second LE may directly send the second information and information about the neighboring cell to the first LE, so that the first LE instructs, based on the information about the neighboring cell TP, the neighboring cell TP to receive the reference signal of the target UE based on the second information.

Optionally, the first LE may pre-store a correspondence between an edge TP and a neighboring cell TP.

When the second LE determines that the edge TP is the serving TP of the target UE, the second LE may directly send the second information and information about the edge TP to the first LE, so that the first LE sends, based on the correspondence between an edge TP and each neighboring cell TP, the second information to the neighboring cell TP corresponding to the edge TP.

S306. A neighboring cell TP sends a measurement report to the first LE.

The neighboring cell TP receives, based on the received second information, the reference signal sent by the target UE, and sends the measurement report to the first LE, to report a measurement result of the reference signal sent by the target UE.

In this embodiment of this application, after receiving the reference signal sent by the target UE, each neighboring cell TP may send a measurement report to the first LE. Alternatively, each neighboring cell TP may pre-store a third preset condition. After the measurement report is determined based on the received reference signal sent by the target UE, the measurement report is sent to the first LE when information (such as signal quality, signal strength, or positioning information) indicated by the measurement report meets the third preset condition.

The third preset condition may be as follows: The signal quality exceeds a preset service threshold; or the signal strength is greater than or equal to a preset signal strength threshold; or the positioning information of the target UE indicates that the target UE is located in a range of the first super cell.

It should be understood that the foregoing enumerated specific content of the third preset condition is merely an example for description, and shall not be construed as any limitation on this application. This application shall not be limited thereto. Another preset condition used for triggering the neighboring cell TP to send the measurement report to the first LE falls within the protection scope of this application.

S307. The first LE determines a first handover policy.

Specifically, the first LE determines the first handover policy based on a first preset condition and measurement reports, and the first handover policy is used to instruct the second LE to perform handover processing. The first handover policy may indicate that a handover is allowed, or that a handover is not allowed. The following describes in detail a case in which the first handover policy indicates that the target UE is allowed to be handed over to the first super cell.

In an implementation, the first LE may determine, based on the first preset condition and the measurement reports sent by the plurality of first TPs (or neighboring cell TPs), whether the signal quality of the reference signal of the target UE meets a service threshold, and whether load of an LE in the first super cell is less than a load threshold. When the first LE determines that the signal quality of the reference signal of the target UE is greater than or equal to the service threshold, and the load of the LE in the first super cell is less than the load threshold, it is determined that the target UE is allowed to be handed over to the first super cell.

After determining that the target UE is allowed to be handed over, the first LE performs S308, and notifies the second LE of the first handover policy. The second LE may perform S309, and determine, based on a second preset condition, the signal quality of the reference signal of the target UE in the second super cell, and a load status of the second LE, whether the target UE is allowed to be handed over to the first super cell. If the second LE determines that the signal quality of the reference signal of the target UE in the second super cell is less than a preset service threshold, or load of an LE in the second super cell is greater than a preset load threshold, it may be determined that the target UE is allowed to be handed over to the first super cell. Therefore, the LE in either of two super cells determines, with reference to the measurement reports sent by the TPs in the super cell, whether the UE is allowed to be handed over from the second super cell to the first super cell, so as to reduce signaling interaction caused when the first LE sends a measurement report to the second LE or when the second LE sends a measurement report to the first LE, thereby reducing signaling overheads.

It should be noted that, in this embodiment of this application, the second preset condition and the first preset condition may be the same, or may be different. This application imposes no special limitation thereto. Optionally, the second LE may directly notify, based on a handover permission decision made by the first LE, that the target UE is to be handed over to the first super cell.

In another implementation, the second LE may send the measurement reports of the plurality of second TPs to the first LE, and the first LE may determine, based on the measurement reports sent by the second LE and the measurement reports sent by the plurality of first TPs (or neighboring cell TPs), whether a quantity of target TPs in the plurality of first TPs is greater than a quantity of target TPs in the plurality of second TPs. The target TP is a TP receiving the reference signal that is sent by the target UE and whose signal quality is greater than or equal to a preset service threshold. Therefore, the first LE determines whether the target UE is allowed to be handed over to the first super cell. The LE in the first super cell may make a more accurate and reasonable decision because the first LE understands better a load status in the super cell.

Alternatively, the first LE may determine, based on measurement reports sent by the second LE and the plurality of first TPs (or the neighboring cell TPs), a TP that receives a best-quality reference signal of the target UE in the first super cell and the second super cell, and use a super cell in which the TP of the best signal quality is located as a super cell that provides the target UE with a communication service. In other words, when the first LE determines that the TP of the best signal quality is in the first super cell, it is determined that the target UE is handed over to the first super cell; or when the first LE determines that the TP of the best signal quality is in the second super cell, it is determined that the target UE still camps on the second super cell.

It should be understood that the foregoing enumerated specific content of the first preset condition and the second preset condition in which the first LE determines to hand over the target UE to the first super cell is merely an example for description, and shall not constitute any limitation on this application. This application shall not be limited thereto. For example, alternatively, the second LE may directly determine, based on the positioning information of the target UE, whether to hand over the target UE to the first super cell.

S308. The first LE sends indication information of the first handover policy to the second LE.

In this embodiment of this application, when the first handover policy indicates that the target UE is allowed to be handed over to the first super cell, the indication information of the first handover policy is a handover notification, and the handover notification is used to instruct the second LE to hand over the target UE to the first super cell. When the first handover policy indicates that the target UE is not allowed to be handed over to the first super cell, the indication information of the first handover policy is a handover rejection notification, and the handover rejection notification is used to notify the second LE that the first LE does not allow to hand over the target UE to the first super cell.

In this embodiment of this application, if the first LE does not allow to hand over the target UE to the first super cell, the target UE still camps on the second super cell. If the first LE allows to hand over the target UE to the first super cell, the following steps continue to be performed.

S309. The second LE determines a second handover policy based on a second preset condition and the measurement reports sent by the plurality of second TPs.

The second LE may determine the second handover policy based on the received handover notification, the second preset condition, and the measurement reports sent by the plurality of second TPs. Alternatively, after the first LE allows to hand over the target UE to the first super cell, the second LE performs evaluation again, and determines whether to hand over the target UE to the first super cell.

The second LE may determine, based on the second preset condition and the measurement reports sent by the plurality of second TPs, that the target UE is allowed to be handed over to the first super cell, or may determine that the target UE is not allowed to be handed over to the first super cell.

S310. The second LE sends indication information of the second handover policy to the first LE.

Specifically, the second LE may determine the second handover policy based on the second preset condition and the measurement reports sent by the plurality of second TPs. The second handover policy may indicate that the target UE is allowed to be handed over to the first super cell, or that the target UE is not allowed to be handed over to the first super cell.

In this embodiment of this application, if the second LE determines that the target UE is allowed to be handed over to the first super cell, the second LE sends a handover response to the first LE, and instructs the first LE to hand over the target UE to the first super cell. If the second LE determines that the target UE is not allowed to be handed over to the first super cell, the second LE sends a handover prohibition notification to the first LE, or does not send a handover response to the first LE. This application imposes no special limitation thereto.

After the first LE receives the handover response sent by the second LE, the following steps continue to be performed.

S311. The first LE sends first information to the target UE.

After the first LE receives the handover response sent by the second LE, the first LE may send the first information to the target UE. Specifically, the first information includes a sequence ID and a tracking channel resource of the target UE in the first super cell, or includes a pilot resource of the target UE in the first super cell. It should be understood that the first information includes but is not limited thereto. The first information may further include information about another radio resource configured by the first LE for the target UE, so as to perform data communication of the target UE in the first super cell. This application imposes no special limitation thereto.

Optionally, the first LE may further send resource configuration information to the target UE. The resource configuration information carries the radio resource configured by the first LE for the target UE.

The radio resource may include an ID of the first LE, a carrier of the first LE, a dedicated random access parameter, and the like. It should be understood that the radio resource is similar to a radio resource used for data communication in a current system. For brevity, details are not described herein again.

S312. The second LE sends a handover notification to the target UE, where the handover notification carries the first information.

S313. The target UE sends an access request to the first LE based on the handover notification.

After receiving the first information sent by the first LE, the second LE may directly send the handover notification to the target UE, and add the first information to the handover notification. The target UE may be handed over to the first super cell based on the received handover notification, and send a reference signal in the first super cell based on the first information.

Optionally, the first LE and the second LE may belong to a same central controller. In this case, the central controller may directly determine, based on the measurement reports that are respectively received by the first LE and the second LE and sent by the plurality of first TPs and the plurality of second TPs, whether to hand over the target UE from the second super cell to the first super cell. Therefore, signaling interaction between the first LE and the second LE is reduced.

Therefore, according to the super-cell handover method in this embodiment of this application, the plurality of first TPs measure the reference signal sent by the target UE in the second super cell, and send measurement reports to the first LE. The first LE determines, based on the measurement reports sent by the plurality of first TPs and the first preset condition, whether to hand over the target UE to the first super cell, thereby implementing a super-cell handover of the target UE. Compared with a cell handover method in a current method, this method may resolve a problem that frequent handovers in a high-density cell deployment scenario consume signaling overheads and air interface resources. In addition, the first information used for channel measurement in the first super cell is sent to the target UE before the handover of the target UE, so that the target UE is smoothly handed over between the super cells.

With reference to FIG. 3, the foregoing describes in detail the super-cell handover method 300 according to the embodiment of this application. With reference to FIG. 4, the following describes in detail a super-cell handover method 400 according to another embodiment of this application.

FIG. 4 is a schematic flowchart of a super-cell handover method 400 according to another embodiment of this application. As shown in FIG. 4, the method 400 includes the following steps.

S401. Target UE in a second super cell sends a reference signal.

S402. A plurality of second TPs send measurement reports to a second LE.

S403. The second LE determines a serving TP of the target UE.

S404. The second LE sends a service notification to the serving TP.

S405. An edge TP sends second information to a neighboring cell TP.

S406. The neighboring cell TP sends a measurement report to a first LE.

A specific process of S401 to S406 is similar to a specific process of S301 to S306. For brevity, details are not described herein again.

S407. The first LE sends the measurement report to the second LE.

S408. The second LE determines, based on a preset condition, measurement reports sent by a plurality of first TPs, and the measurement reports sent by the plurality of second TPs, to hand over the target UE to a first super cell.

The preset condition is the same as or different from the first preset condition or the second preset condition in the method 300.

S409. The second LE sends a handover request to the first LE.

S410. The first LE sends a handover response to the second LE based on the handover request, where the handover response carries first information.

S411. The second LE sends a handover notification to the target UE, where the handover notification carries the first information.

S412. The target UE sends an access request to the first LE.

A specific process of S411 and S412 is similar to a specific process of S311 and S312. For brevity, details are not described herein again.

Therefore, according to the super-cell handover method in this embodiment of this application, the plurality of first TPs measure the reference signal sent by the target UE in the second super cell, and the first LE sends the measurement reports to the second LE. The second LE determines, based on the measurement reports sent by the plurality of first TPs and the measurement reports sent by the plurality of second TPs, whether the target UE is allowed to be handed over to the first super cell, thereby implementing a super-cell handover of the target UE. Compared with a cell handover method in a current method, this method may resolve a problem that frequent handovers in a high-density cell deployment scenario consume signaling overheads and air interface resources. In addition, the first information used for channel measurement in the first super cell is sent to the target UE before the handover of the target UE, so that the target UE is smoothly handed over between the super cells.

With reference to FIG. 4, the foregoing describes in detail the super-cell handover method 400 according to another embodiment of this application. With reference to FIG. 5, the following describes in detail a super-cell handover method 500 according to still another embodiment of this application.

FIG. 5 is a schematic flowchart of a super-cell handover method 500 according to still another embodiment of this application.

It should be noted that both the method 300 and the method 400 are applicable to ECO UE and active UE, and the method 500 is applicable to the active UE. In the method 500, a specific method in which a first LE or a second LE determines to hand over target UE to a first super cell is the same as a specific method in the method 400. As shown in FIG. 5, the method 500 includes the following steps.

S501. Target UE in a second super cell sends a reference signal.

S502. A plurality of second TPs send measurement reports to a second LE.

S503. The second LE determines a serving TP of the target UE.

S504. The second LE sends a service notification to the serving TP.

S505. An edge TP sends second information to a neighboring cell TP.

S506. The neighboring cell TP sends a measurement report to a first LE.

S507. The first LE sends the measurement report to the second LE.

S508. The second LE determines, based on a preset condition, measurement reports sent by a plurality of first TPs, and the measurement reports sent by the plurality of second TPs, to hand over the target UE to a first super cell.

A specific process of S501 to S508 is similar to a specific process of S401 to S408. For brevity, details are not described herein again.

S509. The second LE sends a handover request to the first LE, where the handover request carries service information of the target UE.

S510. The first LE configures a radio resource for the target UE based on the service information of the target UE.

S511. The first LE sends a handover notification to the second LE based on the handover request sent by the second LE, where the handover notification carries resource configuration information.

S512. The second LE sends a handover notification to the target UE, where the handover notification carries the resource configuration information.

S513. The target UE sends an access request to the first LE.

S514. The target UE performs data communication with the neighboring cell TP.

Before the handover of the target UE, the first LE may determine, based on the measurement report, that signal quality of the reference signal that is received by the neighboring cell TP and that is sent by the target UE is relatively good. Therefore, after the target UE is handed over to the first super cell, the neighboring cell TP is the serving TP of the target UE, and the target UE performs the data communication with the neighboring cell TP.

After the target UE is handed over to the first super cell, because the target UE is still in an active state and does not need to send a sequence ID on a tracking channel, the first LE does not need to allocate first information to the target UE in advance. Before the target UE switches to an ECO state, the target UE may inherit an ID in the second super cell, and release a tracking channel resource in the second super cell.

S515. The first LE sends first information to the neighboring cell TP.

S516. The neighboring cell TP sends the first information to the target UE.

Optionally, the neighboring cell TP may send the first information to the target UE using RRC signaling or a Media Access Control (MAC) layer command.

Therefore, according to the super-cell handover method in this embodiment of this application, after the second LE sends the handover request of handing over the target UE to the first super cell to the first LE, the first LE may directly configure the radio resource for the target UE based on the service information of the target UE, so that the target UE may directly communicate with the neighboring cell TP after accessing the first super cell. In addition, after the target UE accesses the first super cell, the first information used for channel measurement is sent to the target UE, so as to reduce signaling interaction between the first LE and the second LE, and reduce signaling overheads.

Figure 6:
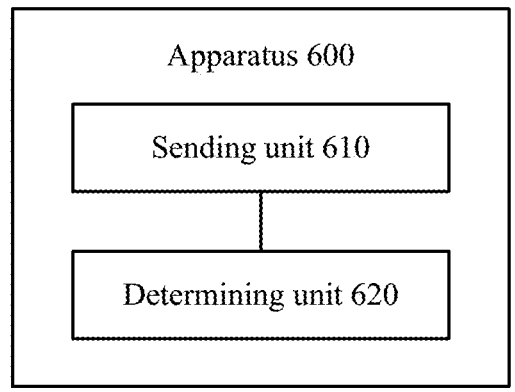
FIG. 6 is a schematic block diagram of a super-cell handover apparatus according to an embodiment of this application.
Figure 7:
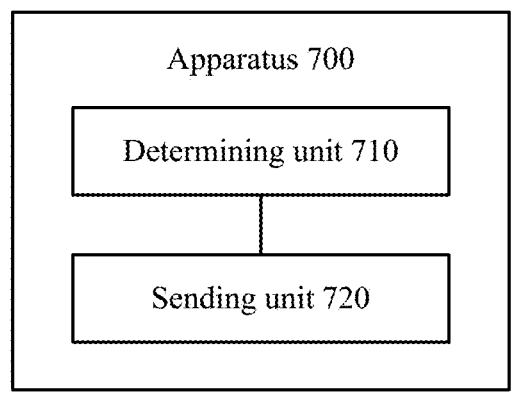
FIG. 7 is a schematic block diagram of a super-cell handover apparatus according to an embodiment of this application.
Figure 8:
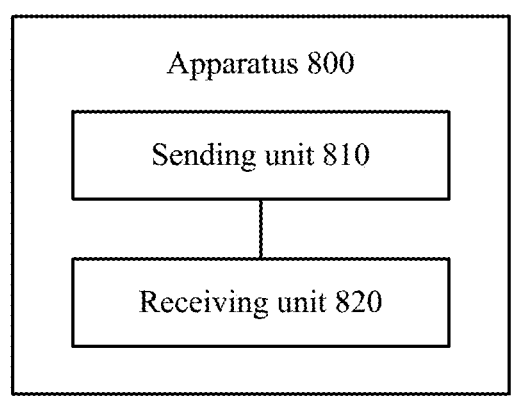
FIG. 8 is a schematic block diagram of a super-cell handover apparatus according to an embodiment of this application.

With reference to FIG. 3 to FIG. 5, the foregoing describes in detail the super-cell handover methods according to the embodiments of this application. With reference to FIG. 6 to FIG. 8, the following describes in detail super-cell handover apparatuses according to embodiments of this application.

FIG. 6 is a schematic block diagram of a super-cell handover apparatus 600 according to an embodiment of this application. The apparatus is applied to a no cell system, the no cell system includes at least two super cells, each super cell includes a plurality of transmission points TP and one logical entity LE, the at least two super cells include a first super cell and a second super cell, and the first super cell is adjacent to the second super cell. As shown in FIG. 6, the apparatus 600 includes a sending unit 610 and a determining unit 620.

The sending unit 610 is configured to receive measurement reports sent by a plurality of first TPs. The measurement reports are measurement reports determined by the plurality of first TPs based on a reference signal sent by target user equipment UE in the second super cell. The apparatus 600 is an LE in the first super cell. The plurality of first TPs are TPs in the first super cell.

The determining unit 620 is configured to determine a first handover policy based on a first preset condition and the measurement reports. The first handover policy is used to indicate whether the apparatus 600 allows to hand over the target UE from the second super cell to the first super cell.

The sending unit 610 is further configured to send indication information of the first handover policy to a second LE. The indication information is used to instruct the second LE to perform handover processing based on the first handover policy. The second LE is an LE in the second super cell.

The super-cell handover apparatus 600 according to this embodiment of this application may correspond to the first LE in the super-cell handover methods 300, 400, and 500 according to the embodiments of this application. In addition, the units in the apparatus 600 and other operations and/or functions are respectively intended to implement corresponding procedures of the methods in FIG. 3 to FIG. 5. For brevity, details are not described herein again.

Therefore, according to the super-cell handover apparatus in this embodiment of this application, it is determined, based on the first preset condition and the measurement reports sent by the plurality of first TPs, whether the target UE is handed over from the second super cell to the first super cell, thereby implementing a super-cell handover of the target UE. Compared with a cell handover apparatus in a current system, this apparatus may resolve a problem that frequent handovers in a high-density cell deployment scenario consume signaling overheads and air interface resources.

FIG. 7 is a schematic block diagram of a super-cell handover apparatus 700 according to an embodiment of this application. The apparatus 700 is applied to a no cell system, the no cell system includes at least two super cells, each super cell includes a plurality of transmission points TP and one logical entity LE, the at least two super cells include a first super cell and a second super cell, and the first super cell is adjacent to the second super cell. As shown in FIG. 7, the apparatus 700 includes a determining unit 710 and a sending unit 720.

The determining unit 710 is configured to determine, based on measurement reports sent by a plurality of second TPs, that a serving TP of target user equipment UE located in the second super cell is an edge TP. The apparatus 700 is an LE in the second super cell, the plurality of second TPs are TPs in the second super cell, and the edge TP is a TP located on an edge of the second super cell.

The sending unit 720 is configured to send second information used for channel measurement to a plurality of first TPs. The second information is used to instruct the plurality of first TPs to receive, based on the second information, a reference signal sent by the target UE. The plurality of first TPs are TPs in the first super cell.

The super-cell handover apparatus 700 according to this embodiment of this application may correspond to the second LE in the super-cell handover methods 300, 400, and 500 according to the embodiments of this application. In addition, the units in the apparatus 700 and other operations and/or functions are respectively intended to implement corresponding procedures of the methods in FIG. 3 to FIG. 5. For brevity, details are not described herein again.

Therefore, according to the super-cell handover apparatus in this embodiment of this application, after it is determined that the edge TP is the serving TP of the target UE, the second information used for channel measurement is sent to a TP in the first super cell, so that the TP in the first super cell receives, based on the second information, the reference signal sent by the target UE. Therefore, a first LE determines, based on measurement reports sent by the plurality of first TPs, whether the target UE is handed over from the second super cell to the first super cell, thereby implementing a super-cell handover of the target UE. Compared with a cell handover apparatus in a current system, this apparatus may resolve a problem that frequent handovers in a high-density cell deployment scenario consume signaling overheads and air interface resources.

FIG. 8 is a schematic block diagram of a super-cell handover apparatus 800 according to an embodiment of this application. The apparatus 800 is applied to a no cell system, the no cell system includes at least two super cells, each super cell includes a plurality of transmission points TP and one logical entity LE, the at least two super cells include a first super cell and a second super cell, and the first super cell is adjacent to the second super cell. As shown in FIG. 8, the apparatus 800 includes a sending unit 810 and a receiving unit 820.

The sending unit 810 is configured to send a measurement report to a second LE. The measurement report is a measurement report determined by the apparatus 800 based on a reference signal of target user equipment UE in the second super cell. The second LE is an LE in the second super cell. The apparatus 800 is a TP located on an edge of the second super cell.

The receiving unit 820 is configured to receive a service notification sent by the second LE. The service notification is used to notify that the apparatus 800 is a serving TP of the target UE.

The sending unit 810 is configured to send, based on the service notification, second information used for channel measurement to a plurality of first TPs. The second information is used to instruct the plurality of first TPs to receive, based on the second information, the reference signal sent by the target UE. The plurality of first TPs are TPs in the first super cell.

The super-cell handover apparatus 800 according to this embodiment of this application may correspond to the edge TP in the super-cell handover methods 300, 400, and 500 according to the embodiments of this application. In addition, the units in the apparatus 800 and other operations and/or functions are respectively intended to implement corresponding procedures of the methods in FIG. 3 to FIG. 5. For brevity, details are not described herein again.

Therefore, according to the super-cell handover apparatus in this embodiment of this application, the second information used for channel measurement is sent to a TP in the first super cell, so that the plurality of first TPs receive, based on the second information, the reference signal of the target UE. Therefore, a first LE determines, based on measurement reports sent by the plurality of first TPs, whether the target UE is handed over from the second super cell to the first super cell, thereby implementing a super-cell handover of the target UE. Compared with a cell handover apparatus in a current system, this apparatus may resolve a problem that frequent handovers in a high-density cell deployment scenario consume signaling overheads and air interface resources.

Figure 9:
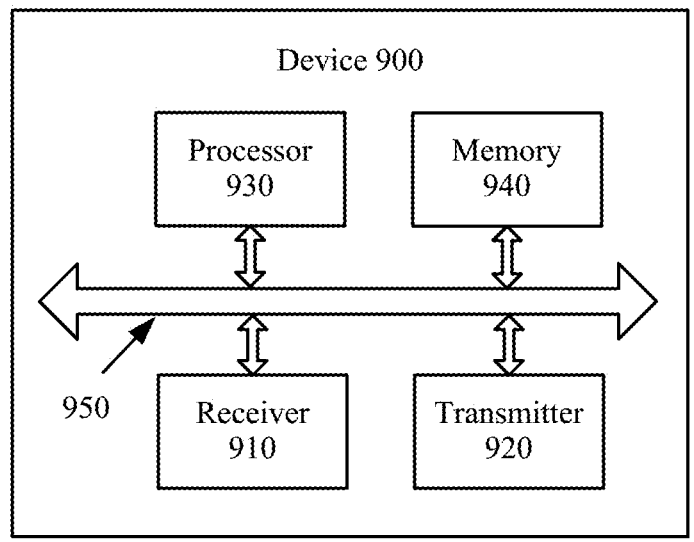
FIG. 9 is a schematic block diagram of a super-cell handover device according to an embodiment of this application.
Figure 10:
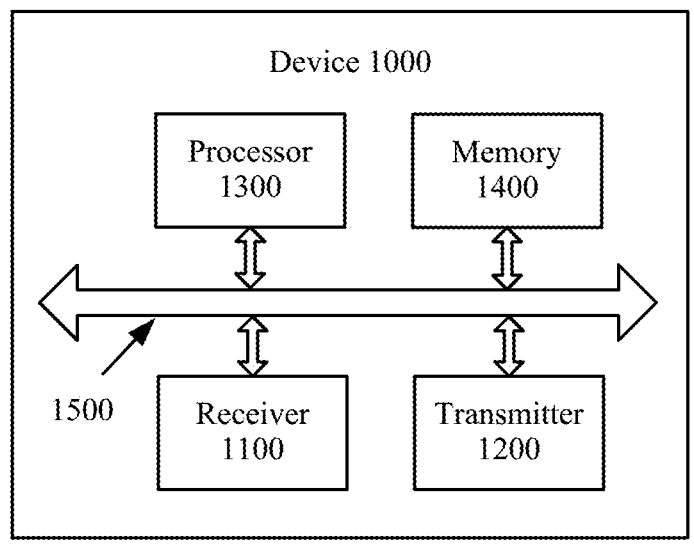
FIG. 10 is a schematic block diagram of a super-cell handover device according to an embodiment of this application.
Figure 11:
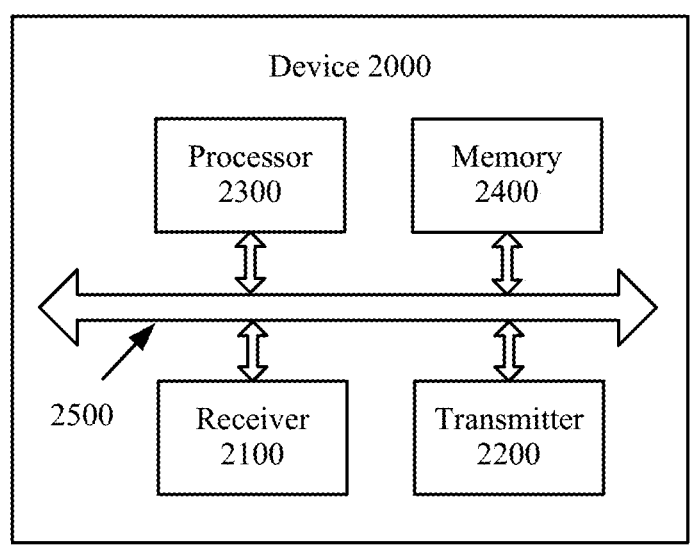
FIG. 11 is a schematic block diagram of a super-cell handover device according to an embodiment of this application.

With reference to FIG. 6 to FIG. 8, the foregoing describes in detail the super-cell handover apparatuses according to the embodiments of this application. With reference to FIG. 9 to FIG. 11, the following describes in detail super-cell handover devices according to embodiments of this application.

FIG. 9 is a schematic block diagram of a super-cell handover device 900 according to an embodiment of this application. The device is applied to a no cell system, the no cell system includes at least two super cells, each super cell includes a plurality of transmission points TP and one logical entity LE, the at least two super cells include a first super cell and a second super cell, and the first super cell is adjacent to the second super cell. As shown in FIG. 9, the device 900 includes a receiver 910, a transmitter 920, a processor 930, a memory 940, and a bus system 950. The receiver 910, the transmitter 920, the processor 930, and the memory 940 are connected to each other using the bus system 950. The memory 940 is configured to store an instruction. The processor 930 is configured to execute the instruction stored in the memory 940, to control the receiver 910 to receive a signal and control the transmitter 920 to send a signal.

The transmitter 920 is configured to receive measurement reports sent by a plurality of first TPs. The measurement reports are measurement reports determined by the plurality of first TPs based on a reference signal sent by target user equipment UE in the second super cell. The device 900 is an LE in the first super cell. The plurality of first TPs are TPs in the first super cell.

The processor 930 is configured to determine a first handover policy based on a first preset condition and the measurement reports. The first handover policy is used to indicate whether the device 900 allows to hand over the target UE from the second super cell to the first super cell.

The transmitter 920 is further configured to send indication information of the first handover policy to a second LE. The indication information is used to instruct the second LE to perform handover processing based on the first handover policy. The second LE is an LE in the second super cell.

It should be understood that, in this embodiment of this application, the processor 930 may be a central processing unit (CPU), or the processor 930 may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

The memory 940 may include a read-only memory and a random access memory, and provides the processor 930 with an instruction and data. A part of the memory 940 may further include a nonvolatile random access memory. For example, the memory 940 may further store information about a device type.

In addition to a data bus, the bus system 950 may further include a power bus, a control bus, a status signal bus, and the like. However, for clarity of description, various buses are marked as the bus system 950 in the figure.

In an implementation process, steps of the foregoing methods may be completed using an integrated logic circuit of hardware in the processor 930 or an instruction in a form of software. The steps of the super-cell handover methods disclosed with reference to the embodiments of this application may be directly performed by a hardware processor, or may be performed using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the memory 940. The processor 930 reads information from the memory 940, and completes the steps of the foregoing methods in combination with the hardware. To avoid repetition, details are not described herein.

The super-cell handover device 900 according to this embodiment of this application may correspond to the first LE in the super-cell handover methods 300, 400, and 500 according to the embodiments of this application and the super-cell handover apparatus 600 according to the embodiment of this application. In addition, the modules in the device 900 and other operations and/or functions are respectively intended to implement corresponding procedures of the methods in FIG. 3 to FIG. 5. For brevity, details are not described herein again.

Therefore, according to the super-cell handover device in this embodiment of this application, it is determined, based on the first preset condition and the measurement reports sent by the plurality of first TPs, whether the target UE is handed over from the second super cell to the first super cell, thereby implementing a super-cell handover of the target UE. Compared with a cell handover device in a current device, this device may resolve a problem that frequent handovers in a high-density cell deployment scenario consume signaling overheads and air interface resources.

FIG. 10 is a schematic block diagram of a super-cell handover device 1000 according to an embodiment of this application. The device 1000 is applied to a no cell system, the no cell system includes at least two super cells, each super cell includes a plurality of transmission points TP and one logical entity LE, the at least two super cells include a first super cell and a second super cell, and the first super cell is adjacent to the second super cell. As shown in FIG. 10, the device 1000 includes a receiver 1100, a transmitter 1200, a processor 1300, a memory 1400, and a bus system 1500. The receiver 1100, the transmitter 1200, the processor 1300, and the memory 1400 are connected to each other using the bus system 1500. The memory 1400 is configured to store an instruction. The processor 1300 is configured to execute the instruction stored in the memory 1400, to control the receiver 1100 to receive a signal and control the transmitter 1200 to send a signal.

The processor 1300 is configured to determine, based on measurement reports sent by a plurality of second TPs, that a serving TP of target user equipment UE located in the second super cell is an edge TP. The device 1000 is an LE in the second super cell, the plurality of second TPs are TPs in the second super cell, and the edge TP is a TP located on an edge of the second super cell.

The transmitter 1200 is configured to send second information used for channel measurement to a plurality of first TPs. The second information is used to instruct the plurality of first TPs to receive, based on the second information, a reference signal sent by the target UE, and the plurality of first TPs are TPs in the first super cell.

The super-cell handover device 1000 according to this embodiment of this application may correspond to the second LE in the super-cell handover methods 300, 400, and 500 according to the embodiments of this application and the super-cell handover apparatus 700 according to the embodiment of this application. In addition, the modules in the device 1000 and other operations and/or functions are respectively intended to implement corresponding procedures of the methods in FIG. 3 to FIG. 5. For brevity, details are not described herein again.

Therefore, according to the super-cell handover device in this embodiment of this application, after it is determined that the edge TP is the serving TP of the target UE, the second information used for channel measurement is sent to a TP in the first super cell, so that the TP in the first super cell receives, based on the second information, the reference signal sent by the target UE. Therefore, a first LE determines, based on measurement reports sent by the plurality of first TPs, whether the target UE is handed over from the second super cell to the first super cell, thereby implementing a super-cell handover of the target UE. Compared with a cell handover device in a current device, this device may resolve a problem that frequent handovers in a high-density cell deployment scenario consume signaling overheads and air interface resources.

FIG. 11 is a schematic block diagram of a super-cell handover device 2000 according to an embodiment of this application. The device 2000 is applied to a no cell system, the no cell system includes at least two super cells, each super cell includes a plurality of transmission points TP and one logical entity LE, the at least two super cells include a first super cell and a second super cell, and the first super cell is adjacent to the second super cell. As shown in FIG. 11, the device 2000 includes a receiver 2100, a transmitter 2200, a processor 2300, a memory 2400, and a bus system 2500. The receiver 2100, the transmitter 2200, the processor 2300, and the memory 2400 are connected to each other using the bus system 2500. The memory 2400 is configured to store an instruction. The processor 2300 is configured to execute the instruction stored in the memory 2400, to control the receiver 2100 to receive a signal and control the transmitter 2200 to send a signal.

The transmitter 2200 is configured to send a measurement report to a second LE. The measurement report is a measurement report determined by the device 2000 based on a reference signal of target user equipment UE in the second super cell. The second LE is an LE in the second super cell. The device 2000 is a TP located on an edge of the second super cell.

The receiver 2100 is configured to receive a service notification sent by the second LE. The service notification is used to notify that the device 2000 is a serving TP of the target UE.

The transmitter 2200 is configured to send, based on the service notification, second information used for channel measurement to a plurality of first TPs. The second information is used to instruct the plurality of first TPs to receive, based on the second information, the reference signal sent by the target UE. The plurality of first TPs are TPs in the first super cell.

The super-cell handover device 2000 according to this embodiment of this application may correspond to the edge TP in the super-cell handover methods 300, 400, and 500 according to the embodiments of this application and the super-cell handover apparatus 800 according to the embodiment of this application. In addition, the modules in the device 2000 and other operations and/or functions are respectively intended to implement corresponding procedures of the methods in FIG. 3 to FIG. 5. For brevity, details are not described herein again.

Therefore, according to the super-cell handover device in this embodiment of this application, the second information used for channel measurement is sent to a TP in the first super cell, so that the plurality of first TPs receive, based on the second information, the reference signal of the target UE. Therefore, a first LE determines, based on measurement reports sent by the plurality of first TPs, whether the target UE is handed over from the second super cell to the first super cell, thereby implementing a super-cell handover of the target UE. Compared with a cell handover device in a current device, this device may resolve a problem that frequent handovers in a high-density cell deployment scenario consume signaling overheads and air interface resources.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, reference may be made to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    receiving, by a first logical entity (LE) of a first super cell, first measurement reports sent by a plurality of first transmission points (TPs), wherein the first measurement reports are determined by the plurality of first TPs based on a reference signal sent by a target user equipment (UE) in a second super cell, wherein the plurality of first TPs are in the first super cell, wherein a no cell system comprises the first super cell and the second super cell, wherein the first super cell is adjacent to the second super cell, wherein the second super cell comprises a second LE, and wherein each super cell of the no cell system comprises a respective plurality of TPs and a respective LE;
    determining, by the first LE, a first handover policy based on a first preset condition and the first measurement reports, wherein the first handover policy indicates whether the first LE allows to hand over the target UE from the second super cell to the first super cell;
    sending, by the first LE, first indication information of the first handover policy to the second LE, wherein the first indication information instructs the second LE to perform handover processing based on the first handover policy;
    receiving, by the first LE, second indication information of a second handover policy sent by the second LE; and
    sending, by the first LE based on the second indication information, first information for channel measurement in the first super cell to the target UE.

2. The method according to claim 1, wherein:
    the plurality of first TPs comprises at least one neighboring cell TP, and each of the at least one neighboring cell TP is adjacent to the second super cell; and
    receiving the first measurement reports sent by the plurality of first TPs comprises:
        receiving, by the first LE, at least one measurement report sent by the at least one neighboring cell TP.

3. The method according to claim 1, wherein the first preset condition comprises a first signal strength of the reference signal of the target UE received by at least one first TP of the plurality of first TPs being greater than a second signal strength of the reference signal that is received by any TP in the second super cell and that is sent by the target UE.

4. The method according to claim 1, wherein the first preset condition comprises:
    a first quantity of target TPs in the first super cell being greater than a second quantity of target TPs in the second super cell, wherein each of the target TPs receives the reference signal that is sent by the target UE, and a signal quality of the reference signal that is received by each of the target TPs is greater than a preset service threshold.

5. The method according to claim 1, wherein the first preset condition comprises:
    a signal quality of the reference signal that is received by at least one first TP of the plurality of first TPs and that is sent by the target UE being greater than a preset service threshold; and
    a first load of the first LE is less than a second load of the second LE.

6. The method according to claim 1, wherein the first preset condition comprises:
    positioning information of the target UE indicating that the target UE is located in an area of the first super cell.

7. The method according to claim 1, wherein:
    the first handover policy indicates that the first LE allows to hand over the target UE to the first super cell;
    the first indication information of the first handover policy is a handover notification;
    the second indication information is a handover response sent by the second LE based on the handover notification, wherein the handover response is determined by the second LE based on second measurement reports sent by a plurality of second TPs and a second preset condition, the handover response notifies the first LE that the second LE allows to hand over the target UE to the first super cell, and the plurality of second TPs are comprised in the second super cell; and the first information comprises a user identifier and a tracking channel resource of the target UE in the first super cell, or comprises a pilot resource of the target UE in the first super cell.

8. The method according to claim 1, wherein the first handover policy indicates that the first LE allows to hand over the target UE to the first super cell, the first indication information of the first handover policy is a handover notification, and the method further comprises:
receiving, by the first LE, an access request sent by the target UE, wherein the access request is sent by the target UE based on the handover notification sent by the first LE; and
after the target UE accesses the first super cell, sending, by the first LE, the first information for channel measurement to the target UE, wherein the first information comprises a user identifier and a tracking channel resource of the target UE in the first super cell, or comprises a pilot resource of the target UE in the first super cell.

9. A method, comprising:
determining, by a second logical entity (LE) of a second super cell, based on second measurement reports sent by a plurality of second transmission points (TPs), that a serving TP of a target user equipment (UE) located in the second super cell is an edge TP, wherein the plurality of second TPs are comprised in the second super cell, wherein the edge TP is located on an edge of the second super cell, wherein a no cell system comprises a first super cell and the second super cell, wherein the first super cell is adjacent to the second super cell, and wherein each super cell of the no cell system comprises a respective plurality of TPs and a respective LE;
sending, by the second LE, second information for channel measurement to a plurality of first TPs, wherein the second information instructs the plurality of first TPs to receive a reference signal sent by the target UE, and the plurality of first TPs are comprised in the first super cell;
receiving, by the second LE, a handover notification sent by a first LE of the first super cell;
sending, by the second LE, a handover response to the first LE in response to the handover notification indicating whether the target UE is allowed to be handed over to the first super cell;
receiving, by the second LE from the first LE and based on the handover response, first information, wherein the first information comprises channel measurement information in the first super cell allocated to the target UE; and
sending, by the second LE to the target UE, the first information.

10. The method according to claim 9, wherein:
the plurality of first TPs comprise at least one neighboring cell TP of the edge TP, and a distance between each of the at least one neighboring cell TP and the edge TP falls within a first preset range; and
sending the second information to the plurality of first TPs comprises:
sending, by the second LE, the second information to each of the at least one neighboring cell TP, wherein the second information instructs each of the at least one neighboring cell TP to receive the reference signal sent by the target UE.

11. The method according to claim 10, wherein sending the second information to each of the at least one neighboring cell TP comprises:
forwarding, by the second LE, the second information to each of the at least one neighboring cell TP using a first LE.

12. The method according to claim 10, wherein:
the handover notification is determined by the first LE based on a first measurement report sent by the neighboring cell TP;
sending, by the second LE, the handover response to the first LE comprises determining, by the second LE based on a second preset condition and measurement reports sent by the plurality of second TPs, that the target UE is allowed to be handed over to the first super cell; and
the first information comprises a user identifier and a tracking channel resource of the target UE in the first super cell, or comprises a pilot resource of the target UE in the first super cell.

13. The method according to claim 12, wherein the second preset condition comprises a first signal strength of the reference signal of the target UE that is received by at least one first TP of the plurality of first TPs being greater than a second signal strength of the reference signal that is received by any TP in the second super cell and that is sent by the target UE.

14. The method according to claim 12, wherein the second preset condition comprises:
a first quantity of target TPs in the first super cell being greater than a second quantity of target TPs in the second super cell, wherein each of the target TPs receives the reference signal that is sent by the target UE, and a signal quality of the reference signal that is received by each of the target TPs is greater than a preset service threshold.

15. The method according to claim 12, wherein the second preset condition comprises:
a signal quality of the reference signal that is received by at least one of the plurality of first TPs and that is sent by the target UE being greater than a preset service threshold, and a first load of the first LE is less than a second load of the second LE; or
positioning information of the target UE indicating that the target UE is located in an area of the first super cell.

16. An apparatus, comprising:
a receiver, configured to:
receive first measurement reports sent by a plurality of first transmission points (TPs), wherein the first measurement reports are determined by the plurality of first TPs based on a reference signal sent by a target user equipment (UE) in a second super cell, the apparatus is a first logical entity (LE) in a first super cell, and the plurality of first TPs are comprised in the first super cell, wherein a no cell system comprises the first super cell and the second super cell, wherein the first super cell is adjacent to the second super cell, wherein the second super cell comprises a second LE, and wherein each super cell of the no cell system comprises a respective plurality of TPs and a respective LE; and
receive second indication information of a second handover policy sent by the second LE;
a processor;
a computer-readable storage medium storing a program to be executed by the processor, the program including instructions for:

determining a first handover policy based on a first preset condition and the first measurement reports, wherein the first handover policy indicates whether the apparatus allows to hand over the target UE from the second super cell to the first super cell;

a transmitter, configured to:

send first indication information of the first handover policy to the second LE, wherein the first indication information instructs the second LE to perform handover processing based on the first handover policy; and send, based on the second indication information, first information for channel measurement in the first super cell to the target UE.

17. The apparatus according to claim 16, wherein the plurality of first TPs comprises at least one neighboring cell TP, a distance between each of the at least one neighboring cell TP and an edge TP falls within a first preset range, and the edge TP is located on an edge of the second super cell; and wherein the receiver is further configured to receive a first measurement report of the first measurement reports sent by the at least one neighboring cell TP.

18. The apparatus according to claim 16, wherein the first preset condition comprises:

a first signal strength of the reference signal of the target UE received by at least one first TP of the plurality of first TPs being greater than a second signal strength of the reference signal that is received by any TP in the second super cell and that is sent by the target UE;

a first quantity of target TPs in the first super cell being greater than a second quantity of target TPs in the second super cell, wherein each target TP receives the reference signal that is sent by the target UE, and a signal quality of the reference signal received by each target TP is greater than a preset service threshold;

a signal quality of the reference signal that is received by at least one first TP of the plurality of first TPs and that is sent by the target UE being greater than the preset service threshold, and a first load of the apparatus being less than a second load of the second LE; or positioning information of the target UE indicating that the target UE is located in an area of the first super cell.

19. The apparatus according to claim 16, wherein:

the first handover policy indicates that the apparatus allows to hand over the target UE to the first super cell;

the first indication information of the first handover policy is a handover notification;

the second indication information is a handover response sent by the second LE based on the handover notification, wherein the handover response is determined by the second LE based on second measurement reports sent by a plurality of second TPs and a second preset condition, the handover response notifies the apparatus that the second LE allows to hand over the target UE to the first super cell, and the plurality of second TPs are comprised in the second super cell; and the first information comprises a user identifier and a tracking channel resource of the target UE in the first super cell, or comprises a pilot resource of the target UE in the first super cell.

20. The apparatus according to claim 16, wherein the first handover policy indicates that the apparatus allows to hand over the target UE to the first super cell, and the first indication information of the first handover policy is a handover notification;

wherein the receiver is further configured to receive an access request sent by the target UE, wherein the access request is sent by the target UE based on the handover notification sent by the apparatus; and wherein the transmitter is further configured to, after the target UE accesses the first super cell, send the first information for channel measurement to the target UE, wherein the first information comprises a user identifier and a tracking channel resource of the target UE in the first super cell, or comprises a pilot resource of the target UE in the first super cell.

\* \* \* \* \*